(12) United States Patent
Weber et al.

(10) Patent No.: US 6,368,659 B1
(45) Date of Patent: Apr. 9, 2002

(54) PROCESS FOR CONSOLIDATING AND HYDROPHOBICIZING SOIL MATERIALS

(75) Inventors: Helmut Weber, Ebersberg; Ulrike Egger, Baldham, both of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/399,448

(22) Filed: Sep. 20, 1999

(30) Foreign Application Priority Data

Sep. 29, 1998 (DE) .......................... 198 44 654

(51) Int. Cl.[7] .................. B05D 7/00; C09K 17/00
(52) U.S. Cl. ............... 427/136; 427/212; 427/215; 405/263
(58) Field of Search ................... 427/136, 137, 427/212, 215; 405/263

(56) References Cited

U.S. PATENT DOCUMENTS

| | | | | |
|---|---|---|---|---|
| 2,462,538 A | * | 2/1949 | Nagel ........................ 106/78 |
| 3,870,425 A | * | 3/1975 | Karonis ...................... 404/76 |
| 4,027,428 A | * | 6/1977 | Hillel ......................... 47/58 |
| 4,415,365 A | * | 11/1983 | Spars et al. ................. 106/85 |
| 4,609,487 A | | 9/1986 | Burkhardt et al. |
| 4,759,665 A | | 7/1988 | Burkhardt et al. |
| 4,822,420 A | | 4/1989 | Burkhardt et al. |
| 5,288,177 A | * | 2/1994 | Montgomery et al. ...... 405/264 |
| 5,356,716 A | * | 10/1994 | Patel ........................ 428/423.1 |
| 5,520,480 A | * | 5/1996 | Ohsaki et al. ............... 404/75 |
| 5,795,104 A | * | 8/1998 | Schanze ..................... 405/263 |

FOREIGN PATENT DOCUMENTS

| | | |
|---|---|---|
| CA | 2 239 946 | 1/1999 |
| DE | 33 29 403 C1 | 1/1985 |
| EP | 0 082 971 A1 | 7/1983 |
| EP | 0 234 504 A2 | 9/1987 |
| EP | 0 889 109 A1 | 1/1999 |
| GB | 1 352 328 | 8/1970 |
| GB | 1 406 289 | 10/1972 |
| GB | 1406289 | * 9/1975 |
| SU | 1 569 336 | 6/1990 |

OTHER PUBLICATIONS

Takao et al., Method for Constructing Road, Derwent WPI (Abstract), Jul. 1992.*

Egger et al., Soil Consolidation and Water–Proofing, Especially of Clayey and Graveily Soils, Derwent WPI (Abstract), Apr. 2000.*

English Abstract corr. to SU 1569336 (no date).

* cited by examiner

Primary Examiner—Shrive P. Beck
Assistant Examiner—Jennifer Calcagni
(74) Attorney, Agent, or Firm—Brooks & Kushman P.C.

(57) ABSTRACT

The invention relates to a process for consolidating and hydrophobicizing soil materials of clay type or of siliceous type, using alkali metal silicates and alkali metal siliconates.

7 Claims, No Drawings

PROCESS FOR CONSOLIDATING AND HYDROPHOBICIZING SOIL MATERIALS

TECHNICAL FIELD

The invention relates to a process for consolidating and hydrophobicizing soil materials of clay type or of siliceous type, using alkali metal silicates and alkali metal siliconates.

BACKGROUND ART

It is already known that soils can be consolidated using hydraulically setting binders, such as highly hydraulic limes and cements, in combination with hydrophobicizing agents such as paraffins. These mixtures are complicated to prepare, since the paraffin must firstly be melted in order to be applied to the hydraulic binder. Another evident disadvantage is that the substances used have only limited chemical reactivity. Paraffins are, for example, not able to react chemically with the constituents of the soil samples. The product here is merely a physical blend which is entirely reversible and therefore cannot have the stability produced by chemical bonding.

DISCLOSURE OF INVENTION

The object was therefore to avoid the disadvantages of the prior art and provide a process which can make it simple to consolidate and hydrophobicize soil materials.

BEST MODE FOR CARRYING OUT THE INVENTION

The invention provides a process for consolidating and hydrophobicizing soil materials by treating soil materials with water, alkali metal silicates and alkali metal siliconates.

The soil materials treated according to the invention may be any known soil materials, in particular soil materials of clay or siliceous type.

The alkali metal silicates used in the novel process may be any desired alkali metal silicates, such as sodium silicates and potassium silicates. The sodium and potassium salts of silicic acid are also termed water glass.

The alkali metal silicates used according to the invention preferably have a weight ratio of $SiO_2$ to alkali metal oxide, in particular $Na_2O$ and/or $K_2O$, of from 2.3 to 3.5, a density of from 1240 to 1535 kg/m³ and a viscosity of from 5 to 850 mPa·s (20° C.).

The alkali metal siliconates used according to the invention are preferably those composed of units of the formula

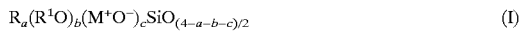

$$R_a(R^1O)_b(M^+O^-)_cSiO_{(4-a-b-c)/2}$$ (I)

where
- each R is identical or different and is a monovalent SiC-bonded organic radical,
- each $R^1$ is identical or different and is a monovalent, unsubstituted or substituted, hydrocarbon radical or hydrogen,
- each $M^+$ is identical or different and is an alkali metal ion or ammonium ion, in particular $Na^+$ or $K^+$,
- a is 0, 1, 2 or 3, preferably 1,
- b is 0, 1, 2 or 3, preferably 1 or 2, and
- c is 0, 1, 2 or 3, preferably 1, with the proviso that the total of a, b and c is less than or equal to 3 and each molecule has at least one radical $(M^+O^-)$.

Examples of radicals R are alkyl radicals such as the methyl, ethyl, n-propyl, isopropyl, n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical, and isooctyl radicals such as the 2,2,4-trimethylpentyl radical; nonyl radicals such as the n-nonyl radical; decyl radicals such as the n-decyl radical; dodecyl radicals such as the n-dodecyl radical; and octadecyl radicals such as the n-octadecyl radical; cycloalkyl radicals such as cyclopentyl, cyclohexyl, cycloheptyl and methylcyclohexyl radicals, aryl radicals such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the a-phenylethyl and the β-phenylethyl radicals.

Radicals R are preferably hydrocarbon radicals having 1 to 12 carbon atoms, particularly preferably the methyl, ethyl or propyl radical, in particular the methyl radical.

Examples of hydrocarbon radicals $R^1$ are the radicals given for R, and radicals $R^1$ are preferably hydrogen atoms or hydrocarbon radicals having from 1 to 6 carbon atoms, particularly preferably hydrogen atoms or the methyl or ethyl radicals, in particular hydrogen atoms.

The alkali metal siliconates used according to the invention are preferably those which are at least to some extent soluble in water at room temperature, and are particularly preferably aqueous solutions of potassium alkylsiliconates. The alkali metal siliconates and alkali metal silicates used according to the invention are commercially available products and/or can be prepared by common methods of silicon chemistry.

Alkali metal silicates and alkali metal siliconates may be used in any ratio in the novel process. The weight ratio of alkali metal silicate to alkali metal siliconate is preferably from 10:1 to 1:10, particularly preferably 1:1.

The amount of water used in the novel process is preferably from 10 to 95 l, based on 100 l of the total amount of water, alkali metal silicate, and siliconate, and amounts of from 70 to 90 l of water on this basis are particularly preferred. Since the amount of water added also depends on the water content of the soils to be treated, the added amount of water may also be below or above the ranges of amounts given above.

The total amounts of alkali metal silicate, alkali metal siliconate and water used in the novel process are preferably from 0.1 to 100 parts by weight, particularly preferably from 0.1 to 10 parts by weight, in particular from 0.5 to 10 parts by weight, based in each case on 100 parts by weight of the soil materials to be treated.

In the novel process, the water, alkali metal silicate and alkali metal siliconate may be mixed in any desired manner with the soil material to be treated. The components used according to the invention may be used individually or in any desired mixtures.

It is advantageous to add a mixture of water, alkali metal silicate and alkali metal siliconate, and also, if desired, additives, to the soil material to be treated. This mixture may be stabilized, for example, by adding aqueous potassium hydroxide, e.g. in amounts of about 10% by weight, based on the total weight of water, alkali metal silicate and siliconate used. The wettability may, in addition, be improved by adding alcohols, such as isopropanol, for example in amounts of from 0.5 to 1.0% by weight, based on the total weight of water, alkali metal silicate and siliconate used.

The advantage of this version of the novel process is that it is significantly easier to meter in and mix in a liquid component of this type. Another advantage of the mixture used according to the invention and composed of water, alkali metal silicate and alkali metal siliconate, and also, if desired, additives, is that it can be diluted with water and has virtually unlimited storage-stability at room temperature and atmospheric pressure.

Once the soil layers have been excavated, these are mixed according to the invention with the mixture of water, alkali metal silicate and alkali metal siliconate, and also, if desired, additives. After mixing the excavated material is generally replaced, compacted and compressed. Even after a very short time, the hydrophobic effect of the siliconate content produces very marked water repellency and therefore water-resistance in the soil layers treated according to the invention. In addition, the compaction and compression, and the formation of silica from the silicate component, produces marked consolidation of the soil layer. After only a short interval the soils prepared in this way can be used as roads or tracks for carrying traffic. The highly advantageous effect of the novel process results in better and greater resistance to wear, which would not otherwise have existed for the traffic intended.

The clay soil samples, in particular, have such excellent strength and water-resistance after compression and after air drying that it is entirely possible to use these in a very simple manner to produce building materials for masonry construction work. This is particularly of great interest in countries which do not have the technical and financial resources to produce building materials such as fired bricks, etc.

Another advantage of the novel process is that the chemical reactivity of the alkali metal components used with the constituents of the soil samples leads to the production of compounds which are stable and cannot be dissociated.

The novel process may be used anywhere where soil materials are to be consolidated and hydrophobicized. It may be used in particular in the construction of tracks and roads, and also for producing water-resistant building materials of appropriate strength for simple masonry construction work. Production of building materials by the novel process has shown that, without firing or curing of the building materials, relatively high strength and water-resistance are achieved, enabling building materials produced in this way to be used for simple building methods, for example in the third world.

In the examples described below all data on parts and percentages are based on weight unless otherwise stated. Unless otherwise stated the examples below are carried out at ambient atmospheric pressure, i.e. about 1000 hPa, and at room temperature, i.e. at about 20° C., or at the temperature obtained when the reactants are brought together at room temperature without additional heating or cooling.

EXAMPLE 1

A mixture is prepared from 15 l of potassium water glass with a weight ratio of $SiO_2$ to alkali metal oxide of from 2.46 to 2.64 (from 19.7 to 20.7% of $SiO_2$), a density of from 1240 to 1250 kg/m$^3$ and a viscosity of from 20 to 40 mPa·s at 20° C. (commercially available under the name 'EHST 28' from Henkel, Germany), 15 l of potassium methyl siliconate of the average formula $CH_3$–$Si(OH)_2O^-K^+$ in the form of a 42% strength solution in water (commercially available under the name WACKER BS® 15 from Wacker-Chemie GmbH, Munich) and 70 l of water. About 0.5 parts by weight of this mixture are fed per 100 parts by weight of excavated soil mixture and the materials are mixed with one another. The resultant soil mixture is then replaced, compacted and compressed. This can be done using conventional building equipment and machinery. This produces, even after just a few hours, a consolidated and hydrophobic soil which can take mechanical loads and can, for example, support traffic.

EXAMPLE 2

A mixture is prepared from 10 l of the potassium water glass described in Example 1, 10 l of the potassium methylsiliconate described in Example 1 and 80 l of water. 2.0 parts by weight of this mixture, and also 7 parts by weight of water, are fed per 100 parts by weight of excavated soil mixture, and the materials are mixed with one another. The resultant soil mixture is then replaced, compacted and compressed. This can be done using conventional building equipment and machinery. This produces, even after just a few hours, a consolidated and hydrophobic soil which can take mechanical loads and can, for example, support traffic.

EXAMPLE 3

The method described in Example 2 is repeated except that, instead of 2.0 parts by weight of the mixture of water, silicate and siliconate, 1.0 part by weight is used. This produces, even after just a few hours, a consolidated and hydrophobic soil which can take mechanical loads and can, for example, support traffic.

EXAMPLE 4

100 parts by weight of soil material are mixed, with stirring, with 1.0 part by weight of the water glass described in Example 1, 0.5 part by weight of potassium methylpropylsiliconate in the form of an approximately 40% strength solution in water (commercially available under the name WACKER BS®20 from Wacker-Chemie GmbH, Munich) and 7.5 parts by weight of water. The resultant soil mixture was then replaced, compacted and compressed. This can be done using conventional building equipment and machinery.

This produces, even after just a few hours, a consolidated and hydrophobic soil which can take mechanical loads and can, for example, support traffic.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for producing shaped building materials, said process comprising:
   a) supplying unconsolidated soil;
   b) treating said unconsolidated soil with water, alkali metal silicates, and alkali metal or ammonium siliconates or mixtures thereof to form unconsolidated, treated soil;
   c) compacting said unconsolidated, treated soil to form a shaped building material without firing said material.

2. A process for consolidating soil, said process comprising adding, per 100 parts of soil, from 0.1 part to 10 parts of a consolidating mixture consisting essentially of water, alkali metal silicate, and at least one of ammonium siliconate or alkali metal siliconate to form treated soil; compacting said treated soil to form compacted treated soil; and allowing said compacted treated soil to harden.

3. A process for consolidating soil, said process comprising adding, per 100 parts of soil, from 0.1 part to 10 parts of a consolidating mixture consisting of water, alkali metal silicate, and at least one of ammonium siliconate or alkali metal siliconate to form treated soil; compacting said treated soil to form compacted treated soil; and allowing said compacted treated soil to harden.

4. A process for consolidating and hydrophobicizing soil materials, said process comprising treating soil materials with a consolidating composition consisting essentially of water, alkali metal silicates, and alkali metal or ammonium siliconates or mixtures thereof to form treated soil, and compacting said treated soil to form a consolidated soil product.

5. The process as claimed in claim 4 wherein the alkali metal silicates and alkali metal siliconates are used in a weight ratio of from 10:1 to 1:10.

6. The process of claim 4 wherein said alkali metal silicate and alkali metal siliconates are employed in a weight ratio of from 10:1 to 1:10, and applied to soil at a weight ratio of 0.1 to 10 parts by weight based on 100 parts by weight soil.

7. The process of claim 4 wherein said alkali metal siliconate or ammonium metal silicate comprises units of the formula:

$$R_a(R^1O)_b(M^+O^-)_c SiO_{(4-a-b-c)/2} \tag{I}$$

where
  each R is identical or different and is a monovalent SiC-bonded organic radical,
  each $R^1$ is identical or different and is a monovalent, unsubstituted or substituted, hydrocarbon radical or hydrogen,
  each $M^+$ is identical or different and is an alkali metal ion or ammonium ion,
  a is 0, 1, 2 or 3,
  b is 0, 1, 2 or 3,
  c is 0, 1,2 or 3,
with the proviso that the total of a, b and c is less than or equal to 3 and each molecule has at least one radical $(M^+O^-)$.

* * * * *